United States Patent
Guo et al.

(10) Patent No.: US 9,826,493 B2
(45) Date of Patent: *Nov. 21, 2017

(54) SYNCHRONIZED MULTI-SINK ROUTING FOR WIRELESS NETWORKS

(71) Applicant: Mitsubishi Electric Research Laboratories, Inc., Cambridge, MA (US)

(72) Inventors: Jianlin Guo, Newton, MA (US); Philip Orlik, Cambridge, MA (US); Kieran Parsons, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 600 days.

This patent is subject to a terminal disclaimer.

(21) Appl. No.: 14/096,218

(22) Filed: Dec. 4, 2013

(65) Prior Publication Data

US 2015/0156738 A1    Jun. 4, 2015

(51) Int. Cl.
*H04W 56/00* (2009.01)
*H04W 40/00* (2009.01)
*H04W 40/24* (2009.01)

(52) U.S. Cl.
CPC ....... *H04W 56/002* (2013.01); *H04W 40/005* (2013.01); *H04W 40/248* (2013.01); *Y02B 60/50* (2013.01)

(58) Field of Classification Search
CPC  H04W 56/002; H04W 40/005; H04W 40/248
See application file for complete search history.

(56) References Cited

U.S. PATENT DOCUMENTS

| | | | |
|---|---|---|---|
| 8,705,577 B2* | 4/2014 | Hansson | H04J 3/0667 370/503 |
| 9,226,253 B2* | 12/2015 | Guo | H04W 56/001 |
| 2009/0147714 A1 | 6/2009 | Jain et al. | |
| 2010/0238917 A1* | 9/2010 | Silverman | H04W 56/0075 370/350 |
| 2010/0290428 A1* | 11/2010 | Fujita | H04W 36/02 370/331 |
| 2011/0035511 A1* | 2/2011 | Biederman | G04G 7/00 709/248 |
| 2012/0113863 A1 | 5/2012 | Vasseur et al. | |
| 2012/0320790 A1 | 12/2012 | Shaffer et al. | |
| 2015/0043519 A1* | 2/2015 | Hui | H04W 72/0446 370/330 |

* cited by examiner

*Primary Examiner* — Gbemileke J Onamuti
(74) *Attorney, Agent, or Firm* — Gene Vinokur; James McAleenan; Hironori Tsukamoto

(57) ABSTRACT

A method transmitting packets in a wireless network including a node, a first data sink and a second data sink is disclosed. The method performs a synchronization of the node with the first data sink and the second data sink and transmits first data packets from the node to the first data sink at a first allocated time synchronized with the first data sink. Next, the method transmits second data packets from the node to the second data sink at a second allocated time synchronized with the second data sink. The first and the second data packets are transmitted without updating the synchronization.

18 Claims, 17 Drawing Sheets

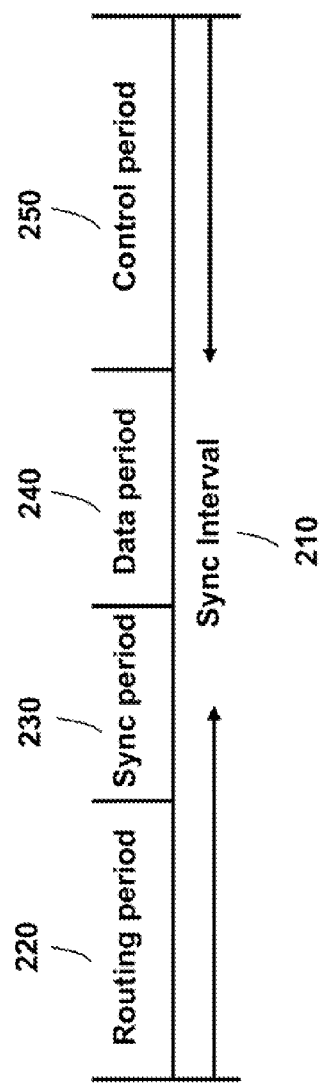
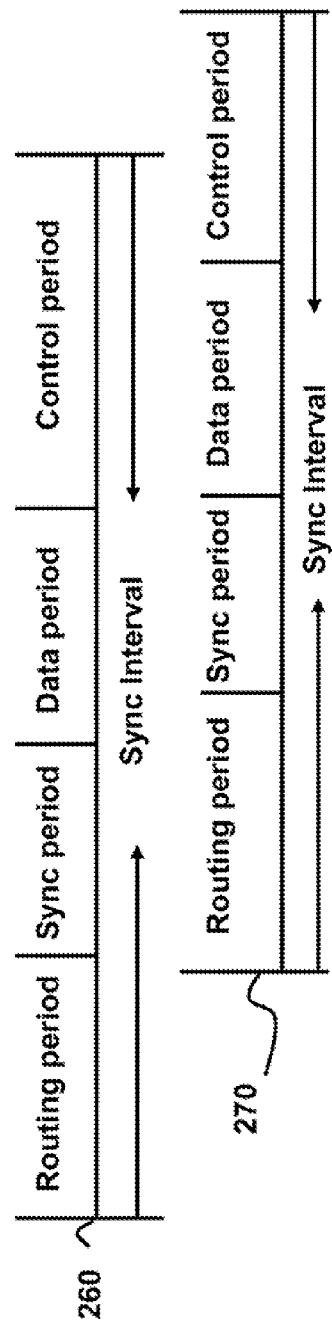

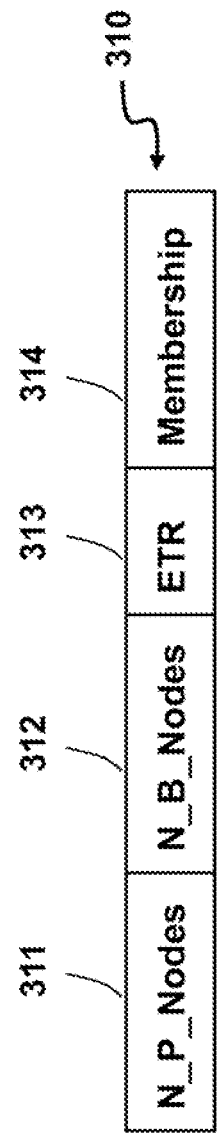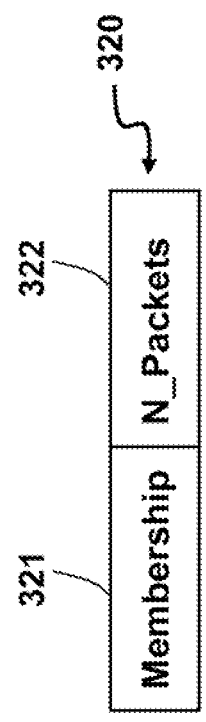
Fig. 3A
Fig. 3B

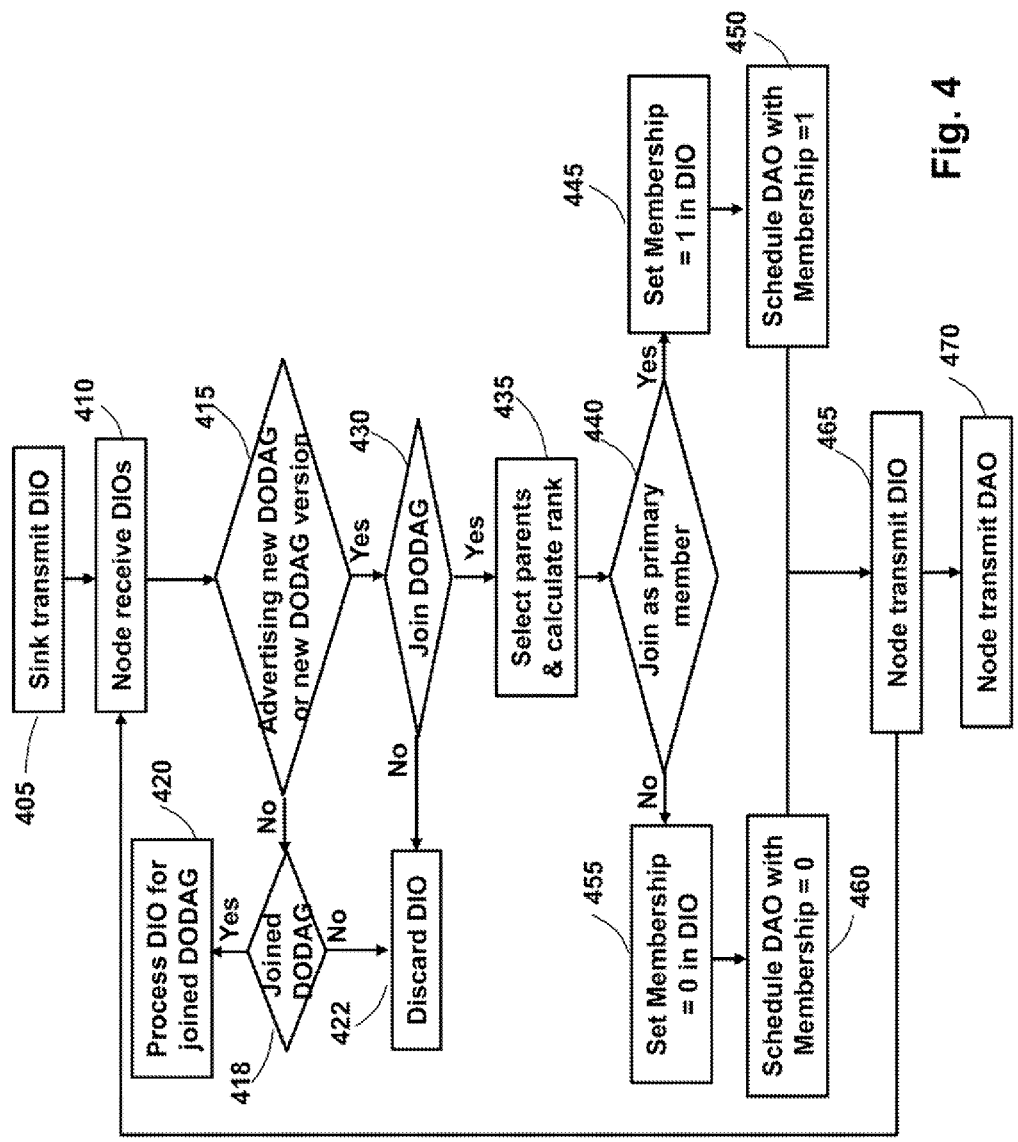

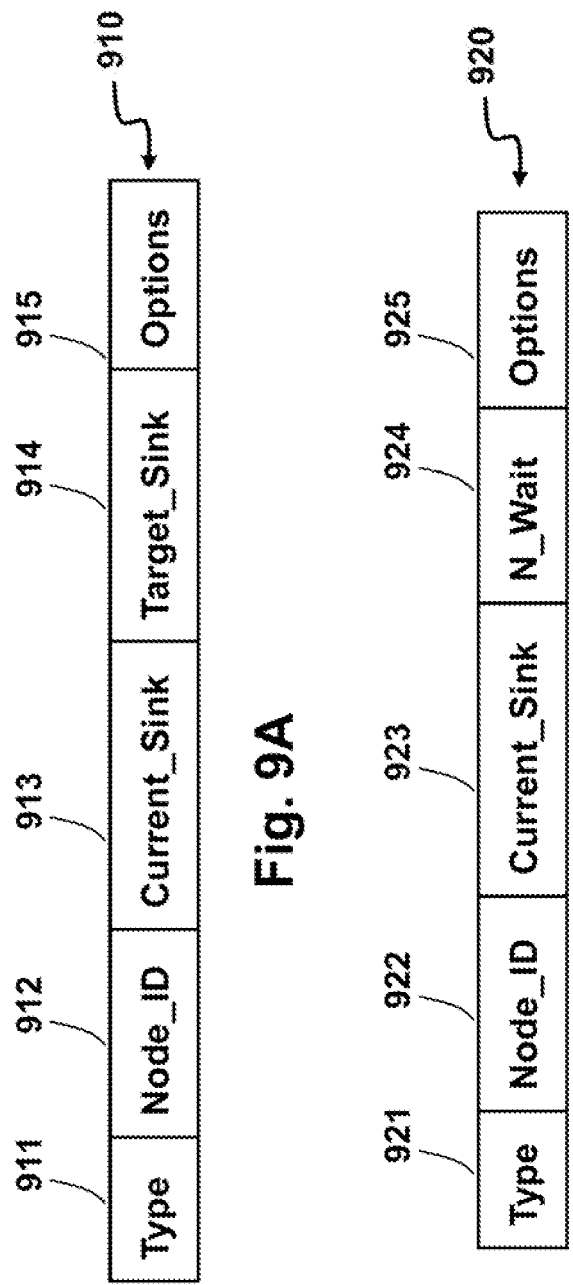

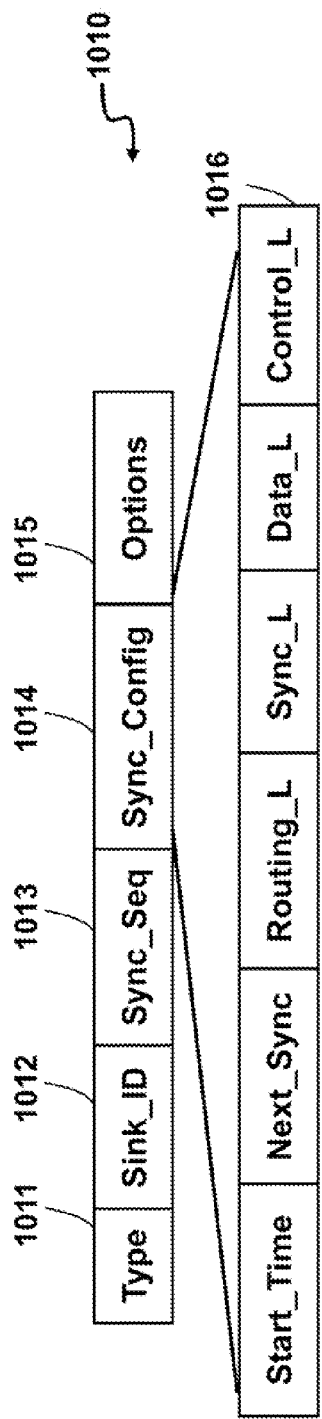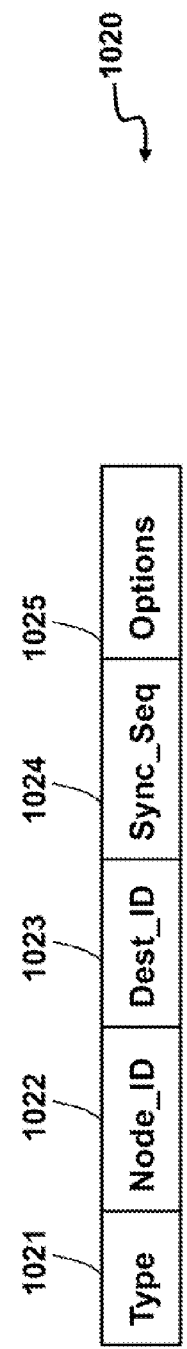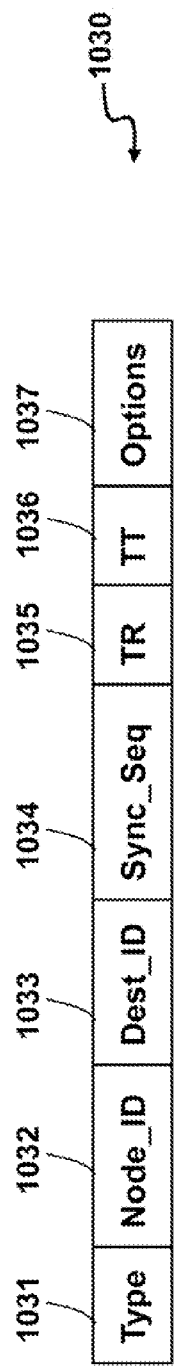
Fig. 10A
Fig. 10B
Fig. 10C

SYNCHRONIZED MULTI-SINK ROUTING FOR WIRELESS NETWORKS

RELATED APPLICATIONS

This application is related to co-pending application MERL-2697 filed concurrently herewith by Guo et al. for "Passive synchronization in wireless networks."

FIELD OF THE INVENTION

This invention relates generally to routing of packets in wireless networks, and particularly to synchronized multi-sink routing for wireless networks.

BACKGROUND OF THE INVENTION

Nodes in low-power and lossy networks (LLNs) are constrained by processing power, memory, power consumption, lifetime, rate of activity, and physical size. The communication links between the nodes can be characterized by high loss rate, low data rate, instability, low transmission power, and short transmission range. There can be from a few dozen up to millions of nodes within a practical LLN. Examples of LLN include a smart meter network, and a wireless sensor network for building monitoring.

In contrast with mobile ad-hoc networks, the LLN can have constrained traffic patterns, although multipoint-to-point traffic, e.g., from nodes to one or more data sinks or concentrators, dominates. The point-to-multipoint and point-to-point traffic rare. The data sink is usually a control point and collects data from nodes in the LLN. The LLN can have multiple data sinks for reliability and efficiency. Data sinks can work cooperatively or independently and can be connected to a data center via network interfaces.

Large scale LLN deployment and a high volume of packet delivery can result in packet losses due to the above constraints. Retransmission can increase network traffic. To increase reliability and reduce overhead, nodes in the LLN with multiple data sink nodes can select optimal routes. However, most conventional routing methods for LLNs are not designed for multi-sink routing.

Several conventional multi-sink routing methods are known. However, those methods are not optimal for LLNs and unsynchronized. For example, the Internet engineering task force (IETF) has developed the IPv6 Routing Protocol for LLNs (RPL), which uses a directed acyclic graph (DAG) to discover routes. Even though RPL is a multi-sink routing protocol, routes are discovered based on building a Destination Oriented DAG (DODAG), which has a single sink node called the DODAG root. After the routes are discovered, a node transmits packets to the DODAG root. RPL does not specify how a node discovers and maintains routes to multiple sinks and how a node switches between multiple sinks. Also, the DODAG is unsynchronized.

The synchronization is required in some LLNs. For example, the synchronization can be used by smart meter network for multi-purpose operations, including metering data collection, demand and response management, control of smart meters and devices connected to smart meter network. As a result, RPL may not be appropriate for multi-sink multi-purpose routing in some LLNs.

U.S. 2012/0236855 describes a method for controlling multi-sink/multi-path routing for a sensor network. That method is designed for safety-critical system. To satisfy the reliability requirement, that routing method transmits multiple copies of the same data to multiple data sinks using multiple paths. The overhead for that method is excessive for large scale LLNs. Also, multi-sink multi-path multiple transmissions can decrease the reliability of the LLNs.

SUMMARY OF THE INVENTION

It is an objective of some embodiment of the invention to provide methods suitable for synchronized multi-sink routing protocol for wireless networks, e.g., low power and lossy networks (LLNs). Some embodiments of the invention are based on the recognition that synchronized multi-sink routing can provide numerous benefits to the network, such as improving network throughput, increasing energy efficiency, prolonging network operating duration, reducing communication overhead and data transmission latency, and ultimately improving data delivery reliability, especially for battery-powered networks.

During the synchronized routing, a node transmits data packets to a data sink at an allocated time synchronized with the data sink. Therefore, synchronization of the node with the data sink is required. However, in response to changing network conditions, the node can switch transmission of the data packets from one data sink to another. If the node is not synchronized with a second data sink, then the synchronization process has to be performed before the node transmits data packets to the second data sink at a second allocated time synchronized with the second data sink. The additional synchronization process increases delay.

Accordingly, some embodiments of the invention are based on a realization that it can be advantageous to synchronize a node with a first data sink and with a second data sink. The multi-sink synchronization enables transmitting data packets to the first and the second data sinks without updating the synchronization.

The multi-sink synchronization can be performed when the node has multiple clocks. However, in various embodiments, the node has only one clock for synchronization. To solve the synchronized multi-sink routing problem, in some embodiments of the invention, the node synchronizes its clock to the clock of the first data sink and maintains clock offsets with the clock of the secondary data sinks. For example, the node can store multiple clock offsets, each clock offset is a difference between the time of the clock of the node and the time of the clock of the corresponding data sink.

Accordingly, one embodiment of the invention discloses a method for transmitting packets in a wireless network including a node, a first data sink and a second data sink. The method includes performing a synchronization of the node with the first data sink and the second data sink; transmitting first data packets from the node to the first data sink at a first allocated time synchronized with the first data sink; and transmitting second data packets from the node to the second data sink at a second allocated time synchronized with the second data sink, wherein the first and the second data packets are transmitted without updating the synchronization.

Another embodiment of the invention discloses a method for transmitting packets in a low power and lossy network (LLN), wherein the LLN includes a set of nodes and a set of data sinks, wherein at least part of the data sinks initiate destination oriented directed acyclic graph (DODAG) formation by configuring and transmitting the DODAG information object (DIO) messages. The method includes selecting a subset of data sinks for a node of the LLN; discovering at least one route from the node to each data sink in the subset; performing, in response to the DODAG formation, a synchronization of the node with each data sink in the subset; designating the data sinks in the subset as a primary data sink and a set of secondary data sink; transmitting data packets from the node to the primary data sink; and switching the designations of the primary data sink and the secondary data sink without updating the synchronization.

Yet another embodiment discloses a node for forming a wireless network. The node includes a clock; a processor for performing a synchronization of the clock of the node with a clock of a first data sink in the network and for determining a clock offset between the clock of the node and a clock of a second data sink in the network; a memory for storing the clock offset; and a transmitter for synchronized transmission of data packets to the first data sink and to the second data sink without updating the synchronization.

BRIEF DESCRIPTION OF THE DRAWINGS

FIG. 2A is a schematic of a structure of a synchronization interval according to some embodiments of the invention;

FIG. 2B is an example of two data sinks with independent synchronization intervals according to some embodiments of the invention;

FIGS. 3A and 3B are schematic of fields in a route discovery message according to some embodiments of the invention;

FIG. 4 is a block diagram of a method for data sink selection and route discovery to each selected data sink in multi-sink LLNs;

FIG. 9A is a schematic of a structure of a primary data sink switching announcement packet according to some embodiments of the invention;

FIG. 9B is a schematic of a structure of a primary data sink switching delay request packet according to some embodiments of the invention;

FIGS. 10A, 10B and 10C are schematics of various synchronization packets according to some embodiments of the invention;

DETAILED DESCRIPTION OF THE PREFERRED EMBODIMENTS

Figure 1A:
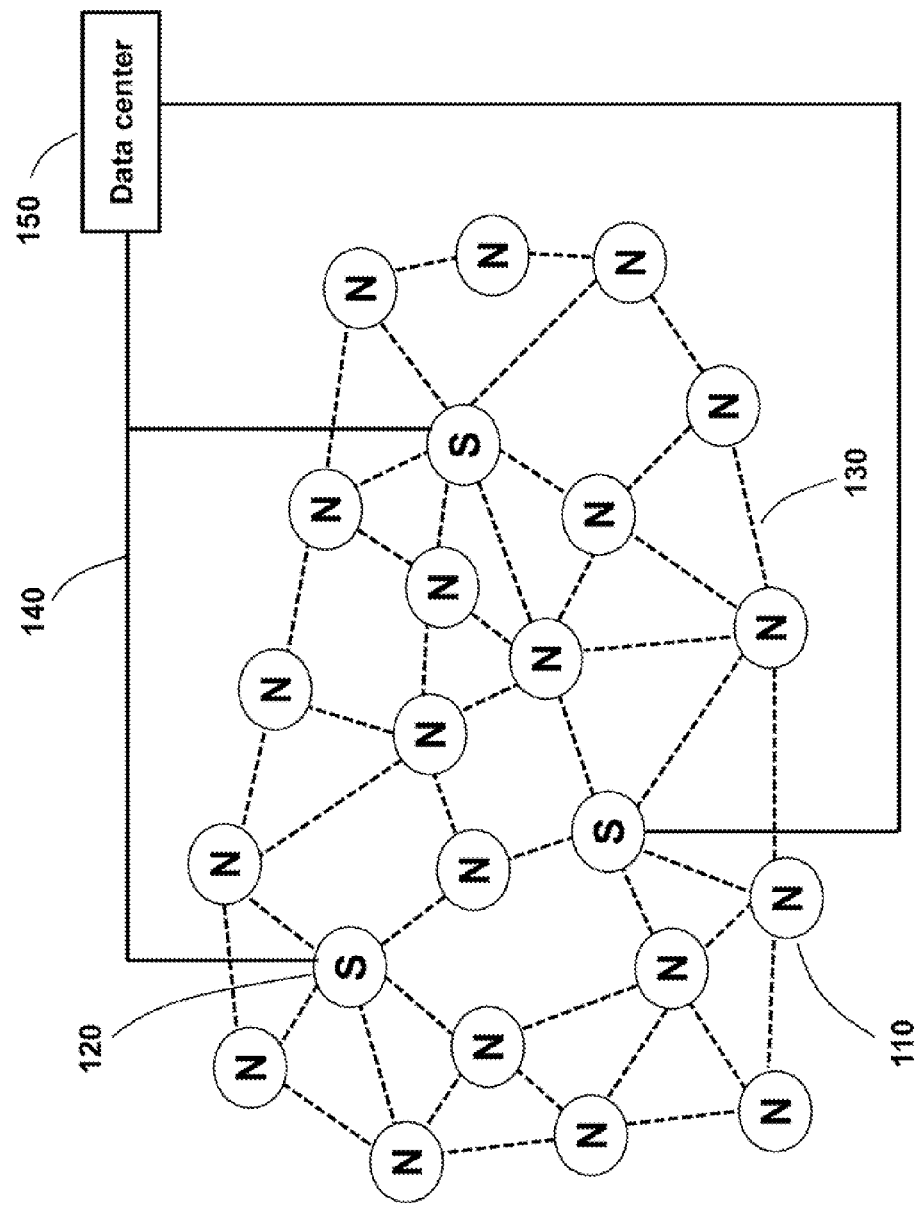
FIG. 1A is a schematic of low power and lossy network (LLN) in which some embodiments of the invention can operate.

FIG. 1A shows a schematic of a low power and lossy network (LLN), in which some embodiments of the invention operate. Although some embodiments are described for a LLN, it understood that various embodiments of the invention can be used with other types of wireless networks, such as smart meter networks, sensor networks, and networks used for industrial automation, building and home automation, and environment monitoring.

The network includes of a set of nodes (N) 110 and a set of data sinks (S) 120. The nodes and sinks form a mesh topology and communicate using wireless links 130. To ensure connectivity, the nodes are arranged such that each node has at least one neighbor. Each node in the LLN transmits packets, such as data packets and control packets through one or multiple links to one or more of data sinks. A node can also forward packets received from neighboring nodes towards the data sinks. The data sink transmits packets, such as routing packets and control packets, via one or multiple links to one or more nodes. A node also forwards packets received from neighbors towards one or more nodes. In addition, the data sinks can be connected to a data center 150 via a link 140.

The nodes and data sinks forming the LLN can perform different functions. Data sinks usually are not data sources, other than for the data center. Each data sink can be responsible for communicating with a subset of nodes, collects data from the subset of nodes as well as manages these nodes. Data sinks can transmit control and management packets to one or more nodes. All LLN nodes can be data sources. Nodes send their data packets to one or more data sinks and respond to control or management packets received from data sinks.

A node can maintain multiple routes to multiple data sinks for data transmission. In various embodiments, the node is synchronized with multiple data sinks. In such manner, the node can rapidly switch its data transmission from one data sink to another without updating the synchronization. Such switching reduces the transmission delay when the network conditions change.

For example, a node selects a first data sink as a primary data sink and a second data sink as a secondary data sink. A node transmits its data packets to primary sink node. A node is a primary member of its primary data sink, and a node is a secondary member of its secondary data sink. A primary member transmits all types of packets including data packet, routing packet, synchronization packet. A secondary member transmits all types of packets except data packet to the secondary data sink. A node can switch designations of its primary data sink with a secondary data sink adaptively based on network conditions and performance.

The data transmission is synchronized and performed within an allocated time, and the node needs to be synchronized to the primary and the secondary data sinks to be able to switch the transmission. For example, during the synchronized transmission, the node transmits first data packets from the node to the first data sink at a first allocated time synchronized with the first data sink, and transmits second data packets from the node to the second data sink at a second allocated time synchronized with the second data sink. The first and the second data sinks do not need to be synchronized, i.e., they can operate independently.

Figure 1B:
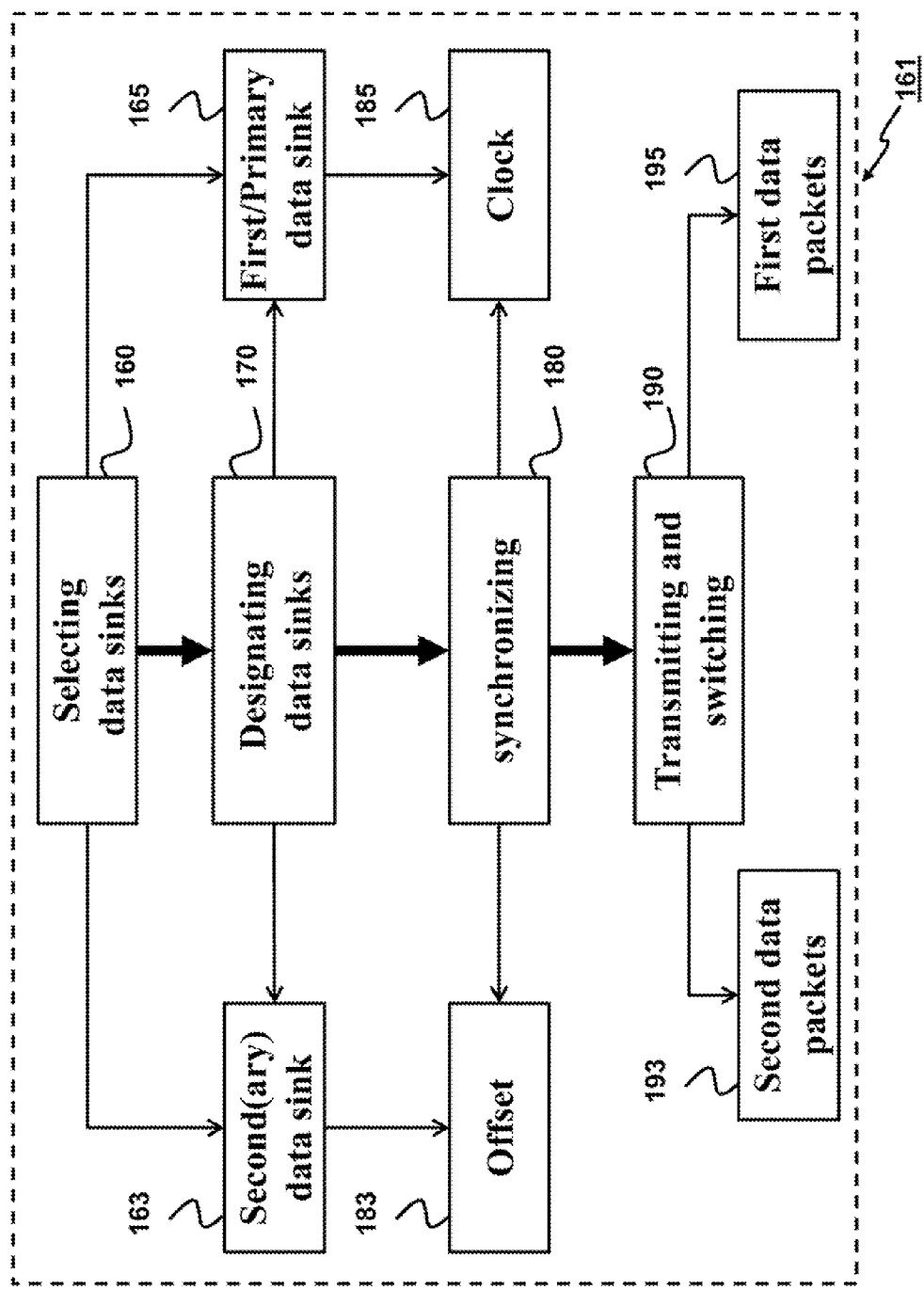
FIG. 1B is a block diagram of a method for transmitting packets in the LLN formed by a set of nodes and multiple data sinks according to some embodiments of the invention.

FIG. 1B shows a block diagram of a method for transmitting packets in the LLN of FIG. 1A. The method can be implemented by a processor 161 of a node in the LLN. The processor is connected to a memory, input/output interfaces, clock 185 and transceivers by buses. The node selects 160 a subset of data sinks. The selected data sinks includes a first data sink 165 and a second data sink 163. The node can designate 170 the first data sink as a primary data sink, and a second data sink as a secondary data sink. The node can also designate multiple secondary data sinks.

The node performs synchronization 180 of a node with the first data sink 165 and with the second data sink 163. Next, the node transmits 190 first data packets 195 from the node to the first data sink at a first allocated time synchronized with the first data sink. The node also transmits 190 second data packets 193 from the node to the second data sink at a second allocated time synchronized with the second data sink, wherein the first and the second data packets are transmitted without updating the synchronization. Thus, the node can perform synchronized transmission to multiple data sinks when the data sinks are not necessarily synchronized to each other.

Typically, the node switches the designation of the data sink before transmitting the second data packet. In one embodiment, the node transmits only to the primary data sinks, but various data sinks can be designated as the primary data sink at different periods of time. The switching can be performed adaptively in response to the change of the condition in the network, and the node can rapidly perform the switching without updating the synchronization.

Some embodiments perform the synchronization of the node to multiple data sinks using multiple clocks of the node. However, in various embodiments, the node has one clock for synchronization. To solve the synchronized multi-sink routing problem, in some embodiments of the invention, the node synchronizes the clock 185 to the clock of the primary data sink and maintains clock offsets 183 to the secondary data sinks, i.e., each clock offset stores a difference between the time of the clock of the node and the time of the clock of the corresponding secondary data sink.

Figure 1C:
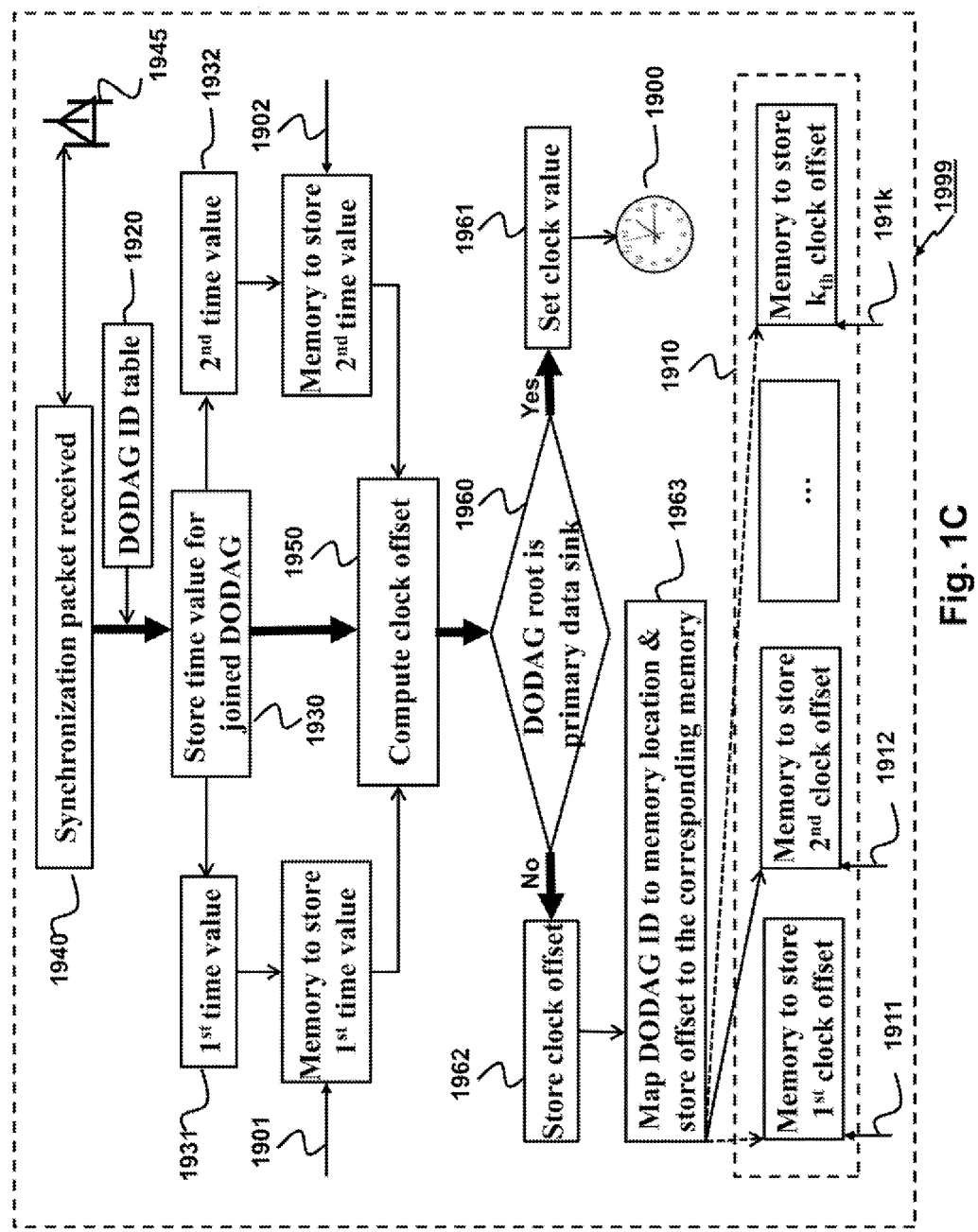
FIG. 1C is a block diagram of a method for storing and manipulating time value and clock offset according to some embodiments of the invention.

FIG. 1C shows a block diagram of a node 1999 employing some principles of the invention. The node can be part of a low power and lossy network (LLN). The node includes a single clock 1900, a processor, such as the processor 161, for performing a synchronization of the clock of the node with a clock of a first data sink in the LLN and for determining a clock offset between the clock of the node and a clock of a second data sink, and a memory 1910 for storing the clock offset. The node can also include a transceiver 1945 for receiving and for synchronized transmission of data packets to the multiple data sinks without updating the synchronization.

The processor of the node stores and manipulates time values and clock offsets. In some embodiments, the processor manages the clock 1900 and allocates memory blocks to store received time values and clock offsets to secondary data sinks. For example, the processor can maintain a pointer 1901 to memory location for the $1^{st}$ time value 1931 and a pointer 1902 to memory location for the $2^{nd}$ time value 1932. The processor can determine 1950 the clock offset based on the time values 1931 and 1932.

The processor can also maintain pointers to the memory locations for clock offsets, e.g., a pointer 1911 to memory location for the $1^{st}$ clock offset, a pointer 1912 to memory location for the $2^{nd}$ clock offset, . . . , a pointer 191k to memory location for the $k_{th}$ (last) clock offset.

In some embodiments, the LLN includes a set of nodes and a set of data sinks, wherein at least part of the data sinks initiate Destination Oriented Directed Acyclic Graph (DODAG) formation by configuring and transmitting the DODAG information object (DIO) messages. In those embodiments, the synchronization is performed in response to the DODAG formation.

For example, in one embodiment the processor maintains in the memory a table 1920 storing DODAG IDs for the joined DODAGs. Upon receiving 1940 a synchronization packet, the table 1920 is used to determine 1930 whether or not to store time value. A node joins a DODAG by selecting the root of DODAG as the primary or secondary data sink. For joined DODAG, i.e., the node is either a primary member of the DODAG or a secondary member of the DODAG, processor stores 1931 the $1^{st}$ time value to memory pointed by pointer 1901 and stores 1932 the $2^{nd}$ time value to memory pointed by pointer 1902. Using the two time values, processor computes 1950 clock offset.

If 1960 the corresponding DODAG root is primary data sink, then the processor sets 1961 the clock value to synchronize its clock 1900 to the clock of the DODAG root. Otherwise, the processor stores 1962 clock offset. To store clock offset, the processor maps 1963 DODAG ID to the specific memory location, and then uses memory location pointer to store clock offset value to the corresponding memory location.

Synchronization Intervals in LLN

FIG. 2A shows a structure of a synchronization (sync) interval 210 used by some embodiments. The synchronization interval includes one or combination of a routing period 220, a synchronization period 230, a data period 240 and a control period 250. A length of each of the periods is determined by the data sink that manages the synchronization process. The routing period and the synchronization period are not necessarily present during every synchronization interval. If any of these two periods is absent, then the period can be used for data packet transmission. During the routing period, the node selects the primary and the secondary data sinks. During the synchronization period, the node synchronizes the clock of the node with the clock of the primary data sink and determines and maintains the clock offsets to the secondary data sinks. During the data period, the node transmits the data packets to the primary data sink. During the control period, control and management packets are transmitted. Retransmission of failed data packet can also take place in control period.

FIG. 2B shows an example in which data sinks 260 S1 and 270 S2 have different synchronization intervals in terms of starting time, and length of each period. In some embodiments, the synchronization is performed after route discovery. Each data sink manages its route discovery and synchronization interval independently. However, in various embodiments of the invention, the data sink can monitor synchronization information of other data sinks to manage its synchronization interval for the best performance. For example, two nearby data sinks can arrange for non-overlapping data periods to achieve a higher data packet delivery rate.

Multi-Sink Selection and Route Discovery for LLN

To provide a routing protocol for LLNs, the Internet Engineering Task Force (IETF) developed the IPv6 Routing Protocol for LLNs (RPL). RPL constructs a Directed Acyclic Graph (DAG) topology to establish bidirectional routes for LLNs. RPL routes are optimized for traffic between one or more roots that act as data sinks. A DAG is partitioned into one or more Destination Oriented DAGs (DODAGs), one DODAG per data sink. Therefore, the DODAG is a defined structure in the RPL. The traffic of the LLNs flows along the edges of the DODAG, either upwards to the root or downwards from the root. Upward routes, having the root as destination, are provided by the DODAG construction mechanism using the DODAG Information Object (DIO) messages. The root configures the DODAG parameters such as DODAG Version Number, DODAGID, and Root Rank and announces these parameters in DIO messages.

To join a DODAG, based on a routing metrics such as hop count or expected transmission count (ETX), a node selects a set of DIO message transmitters as parents on the routes towards the root and determines its own rank. The node also selects a preferred parent as next hop for upward traffic. Upon joining a DODAG, a node transmits the DIO messages to announce the DODAG parameters. The rank of the nodes monotonically decreases as the DODAG version is followed towards the DODAG root. Downward routes, from the root to other destinations, are provided by these destination nodes transmitting the Destination Advertisement Object (DAO) messages.

Some embodiments of the invention use RPL for multi-path route discovery. A node selects multiple routes to its primary data sink and multiple routes to each of its secondary data sinks. For simplicity, some embodiments designate data sink as the DODAG root in RPL. To achieve efficient multi-sink routing, some embodiments of the invention add fields to DIO and DAO messages in RPL that currently are not specified by RPL.

FIG. 3A shows additional fields 310 in the DIO message, including a N_P_Nodes field 311 indicating a number of primary members of the data sink that generates the DIO message, a N_B_Nodes field 312 indicating a number of secondary members of the data sink that generates the DIO message, an ETR field 313 indicating expected reliability estimated by data sink that generates the DIO message, and a Membership field 314 indicating whether DIO message transmitted by a primary member or secondary member of a DODAG. A node is a primary member of a DODAG if the node selects root of the DODAG as its primary data sink. A node is secondary member of a DODAG if the node selects root of the DODAG as its secondary data sink.

Initially, the data sink sets N_P_Nodes to 0, N_B_Nodes to 0, ETR to 100%, and membership to 1. Data sink estimates ETR as total number of data packets successfully received in a data period divided by total number of expected data packets to be received in a data period. Sink determines total number of expected data packets by using N_Packets field received in DAO messages.

FIG. 3B shows additional fields 320 in the DAO message. A membership field 321 indicates whether the node generating the DAO message is a primary member or secondary member of the DODAG. A N_Packets filed 322 indicates a number of data packets to be transmitted in a data period. A node estimates its expected number of packets in a data period. For example, for a smart meter network, a node transmits one metering data packet in each data period. To propagate information, the DAO can be sent to the DODAG root in both modes of operations.

FIG. 4 shows a block diagram of a data sink selection and route discovery method in multi-sink LLNs according to some embodiments. The data sink initiates a DODAG formation process by transmitting 405 the DIO message with appropriate configurations. During the DODAG formation, propagation of the DIO message establishes routes from the nodes to the root of DODAG. During formation of each DODAG, a node receives 410 multiple copies of DIO messages transmitted by a 405 data sink or by 465 neighboring nodes.

Receiving node checks 415 whether the received DIO message advertises a new DODAG or new DODAG version. If none of the above, then the node checks 418 if DIO message is for a joined DODAG. If no, node discards 422 DIO message. If yes, node processes 420 the DIO message as specified in RPL. If a new DODAG or new DODAG version is advertised, the node decides 430 whether or not to join the advertised DODAG. If no, the node discards 422 DIO message. If yes, based on routing metrics and objective function specified in DIO message, node selects 435 a subset of DIO message transmitters as its DIO parents, i.e., next hop nodes to the root of DODAG, and computes a rank for itself. Then, the node decides 440 whether or not to select the root of DODAG as its primary data sink.

In multi-sink routing, multiple data sinks can initiate their DODAG formation processes. Therefore, a node receives DIO messages initiated by multiple data sinks. After joining selected DODAGs, node selects the root of one DODAG as primary data sink and roots of remaining DODAGs as secondary data sinks. There are many ways that can be used to make decision. The following equation shows how to determine a value P(S) for selecting primary and secondary data sinks:

$$P(S) = ETR(S) * \left(1 - \frac{N(S)_p}{N(S)_{max}}\right) * \left(1 - \frac{N(S)_s}{N(S)_{max}}\right) * \left(1 - \frac{H(S)_{min}}{H(S)_{max}}\right) \quad (1)$$

where S represents a data sink S, ETR(S) is obtained from DIO message, $N(S)_p$ is the number of primary members of the sink S, $N(S)_s$ is the number of secondary members of the sink S, $N(S)_{max}$ is the maximum numbers of nodes can be supported by the sink S, $H(S)_{min}$ is the minimum number of hops from a node to sink S obtained from received copies of DIO message, and $H(S)_{max}$ is the maximum number of hops allowed by the sink S. A node selects a primary data sink S that maximizes the value of P(S) in equation (1) and selects secondary data sinks with subsequent values of P(S) in equation (1).

If a node decides to join the DODAG as a primary member, then the node updates 445 the DIO message with the rank and sets the membership field to 1 and also schedules 450 DAO message transmission with membership set to 1. If node decided joining DODAG as secondary member, then the node updates 455 DIO with its rank and sets Membership to 0 and also schedules 460 DAO message transmission with Membership set to 0. The node also sets N_Packets field to an estimated number. After the DIO message is updated and the DAO message is constructed, the node transmits 465 the updated DIO message to continue DODAG formation process and transmits 470 the DAO message to establish routes from the root of DODAG to node itself.

Figure 5:
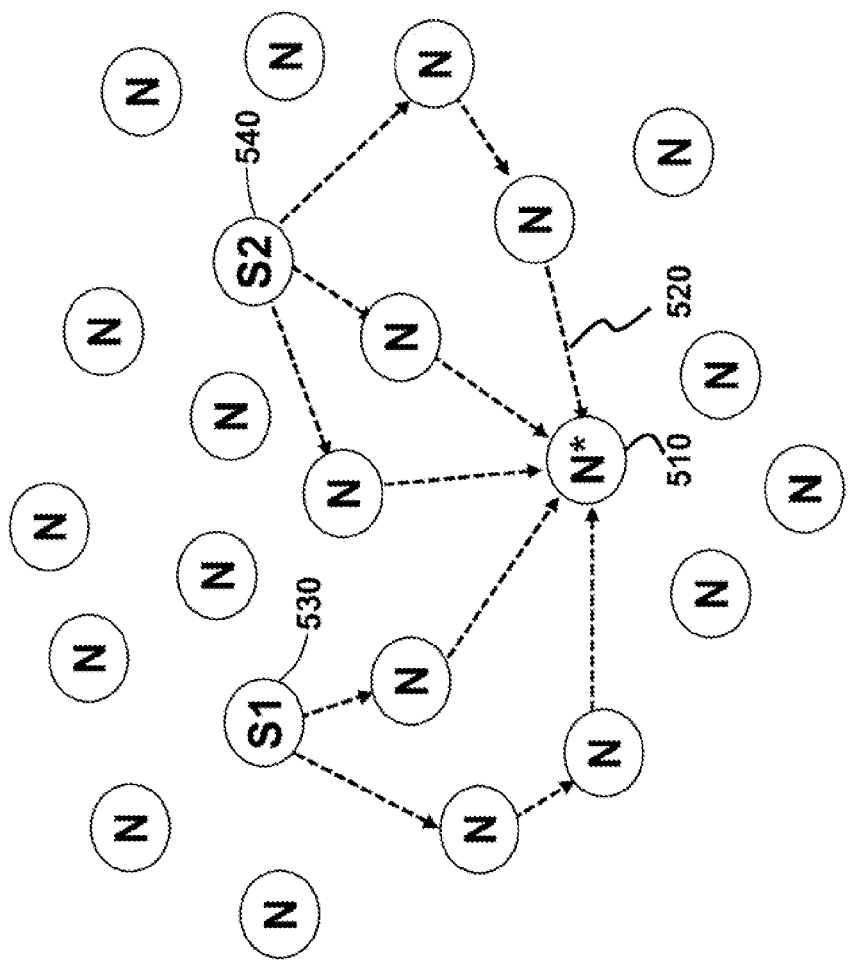
FIG. 5 is a schematic of an example of route discovery message propagation process according to some embodiments of the invention.

FIG. 5 shows an example in which a node N* 510 receives 520 DIO messages initiated by both data sinks 530 S1 and 540 S2. For example, the node N* receives two copies of DIO message initiated by sink S1 and three copies of DIO message initiated by sink S2. The node N* selects S2 as its primary data sink.

Figure 6:
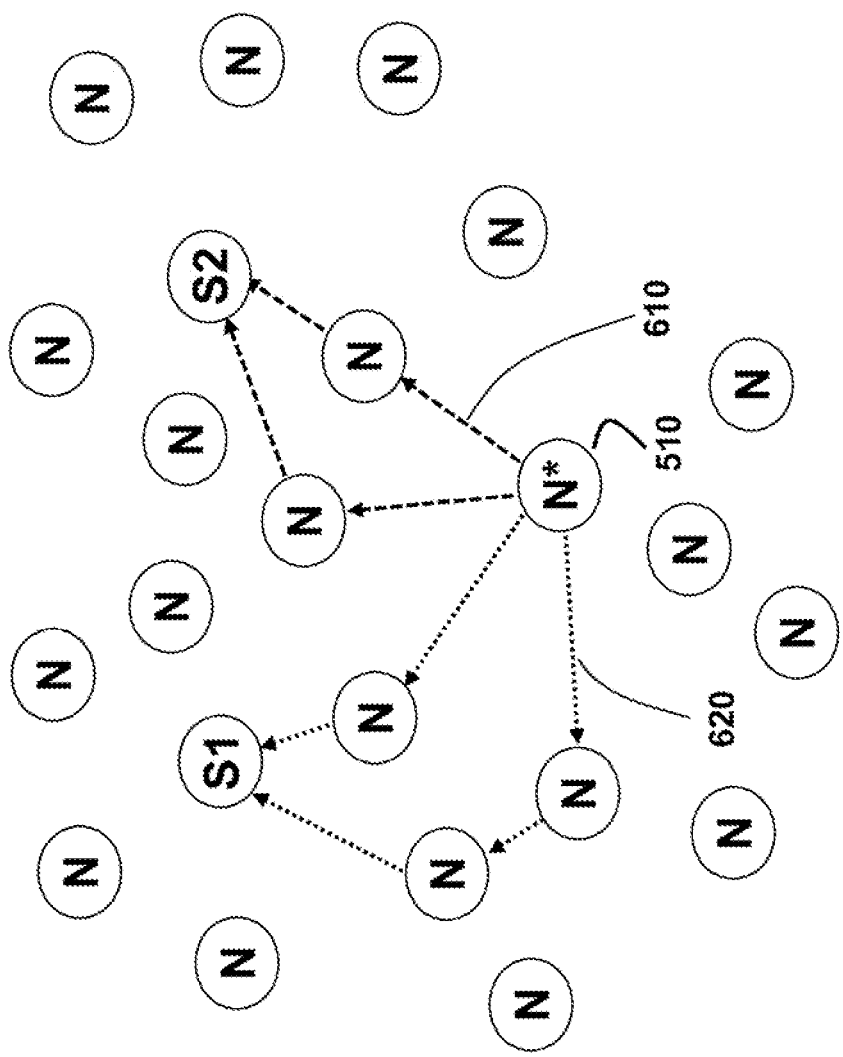
FIG. 6 is a schematic of an example of route confirmation process according to some embodiments of the invention.

FIG. 6 shows an example in which the node N* 510 transmits a DAO message 610 with Membership field equal to 1 for primary DODAG rooted at the data sink S2 and transmits a DAO message 620 with Membership field equal to 0 to a secondary DODAG rooted at the data sink S1.

The $H_{Max}$ parameter in equation (1) can be used to control coverage area of a data sink. For smaller $H_{Max}$, the data sink covers nearer nodes. Advantages include shorter path to primary data sink and shorter delay. Disadvantages include more communication interference when more nodes transmit their data packet in a data period and lower packet delivery rate.

Figures 7A, 7B:
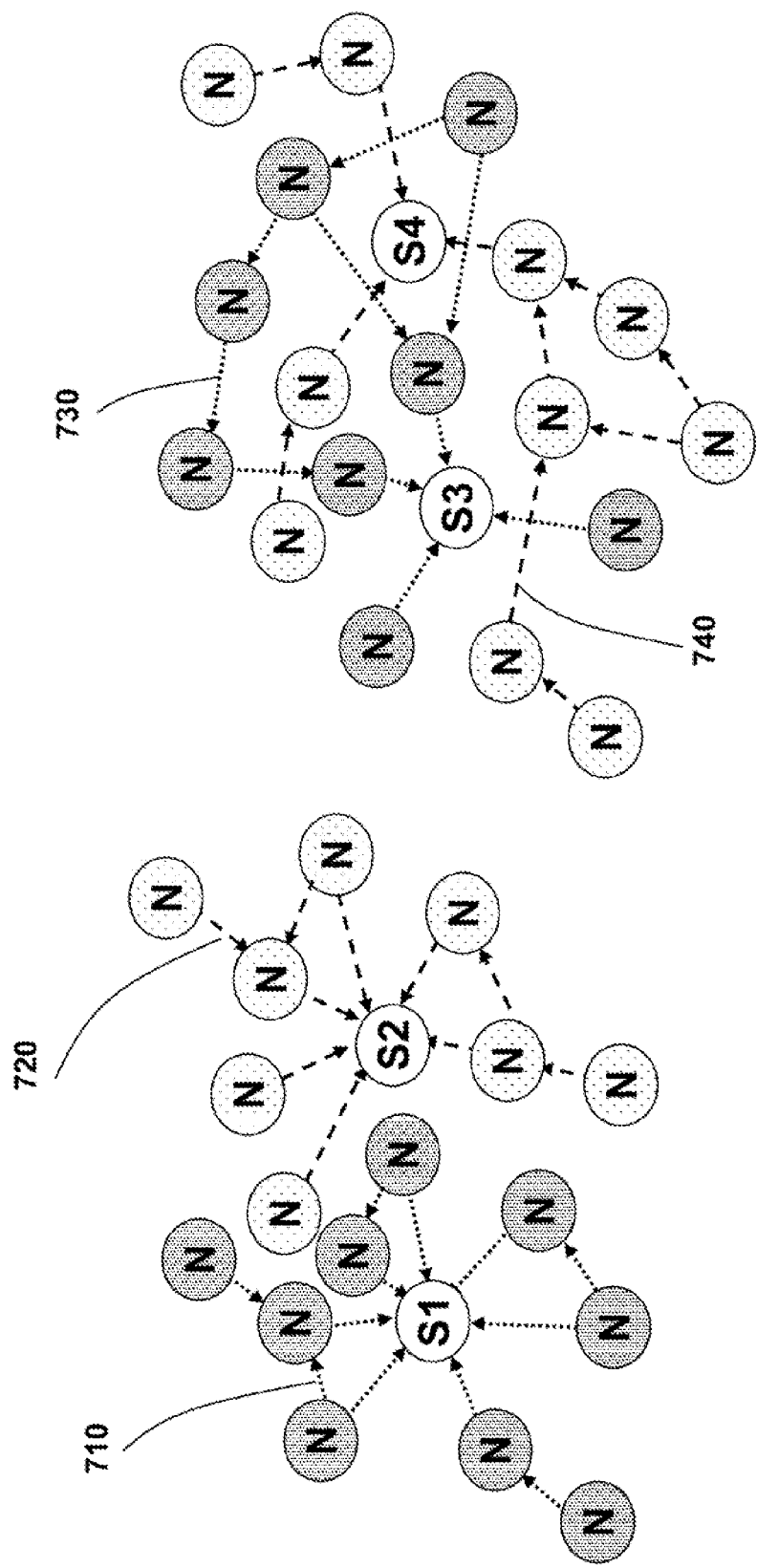
FIGS. 7A and 7B are schematics of examples of coverage area of a data sink.

FIG. 7A shows an example of low power and lossy network with two DODAGs rooted at S1 and S2, respectively. In FIG. 7A $H_{Max}=2$, therefore sinks S1 and S2 cover nodes close to them. S1 covers seven nodes via link 710 and S2 covers eight nodes via link 720. For larger $H_{Max}$, a data sink can cover big area with smaller node density. Advantages of greater coverage include less communication interference in data period and higher packet delivery rate. Disadvantages include longer path to primary sink and longer delay.

FIG. 7B shows an example of low power and lossy network with two DODAGs rooted at S3 and S4, respectively. In FIG. 7B $H_{Max}=4$, therefore sinks S3 and S4 cover a relatively large area. S3 covers eight nodes via link 730 and S4 covers ten nodes via link 740.

By joining multiple DODAGs, a node maintains multiple sets of routing parameters corresponding to multiple data sinks. A node transmits its data to its primary data sink. However, a node can switch its primary data sink with a secondary data sink.

Data Sink Switching

In multi-sink routing, a node can switch the designations of its primary data sink with a secondary data sink without updating the synchronization.

In some embodiments, during the switching, the node maintains the routes of its children nodes to their primary sinks, because the children nodes select their primary sinks independently of the parent node.

Figure 8A:
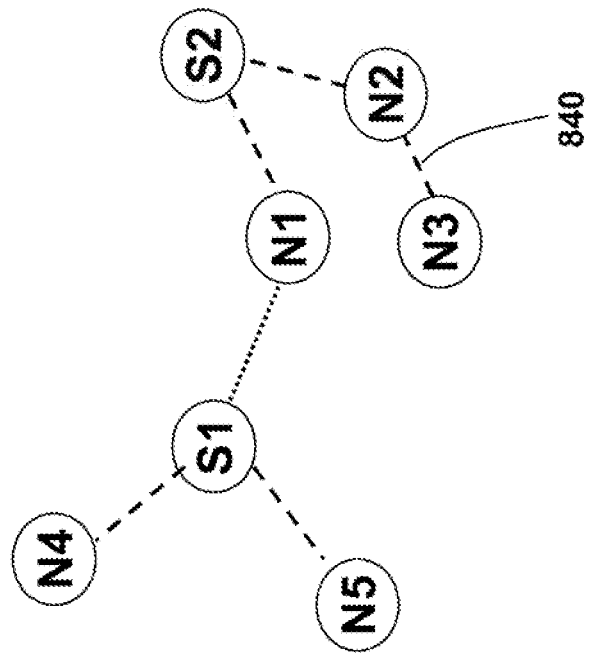
FIG. 8A is a schematic of an example in which a node cannot perform immediate primary data sink switching.

FIG. 8A shows an example in which nodes N4 and N5 select 810 sink S1 as their primary sink. Nodes N1, N2 and N3 select 820 sink S2 as their primary sink. In addition, the node N1 also selects 830 S1 as its secondary sink. However, if node N1 switches its primary sink from S2 to S1, then the switching discontinues a route of the node N3 to its primary sink S2.

To facilitate a switching that does not cut routes, some embodiments define two types of packets, i.e., a primary sink switching announcement packet and a primary sink switching delay request packet.

FIG. 9A shows a primary sink switching announcement packet 910 that includes one or combination of a type field 911 indicating a type of the packet, a Node_ID field 912 indicating node planning to make switching, a Current_Sink field 913 indicating the current primary sink of the node, a Target_Sink field 914 indicating a target primary sink of the node, and an options field 915 including any optional information.

FIG. 9B shows a primary sink switching delay request packet 920 that includes one or combination of a type field 921 indicating a type of the packet, a Node_ID field 922 indicating a node requesting the switching delay, a Current_Sink field 923 indicating the current primary sink of requesting node, a N_Wait field 924 indicating the number of synchronization intervals requested for waiting, and an options field 925 including any optional information.

To avoid cutting the primary route, a node broadcasts a sink switching packet 910 in control period and waits for switching delay request packet 920. If node does not receive switching delay request packet by the end of synchronization interval, then the node switches its primary sink from Current_Sink to Target_Sink in next synchronization interval by transmitting DAO messages to Current_Sink and Target_Sink with appropriate membership settings. If node receives a switching delay request packet, then the node waits for N_Wait synchronization intervals.

Figure 8B:
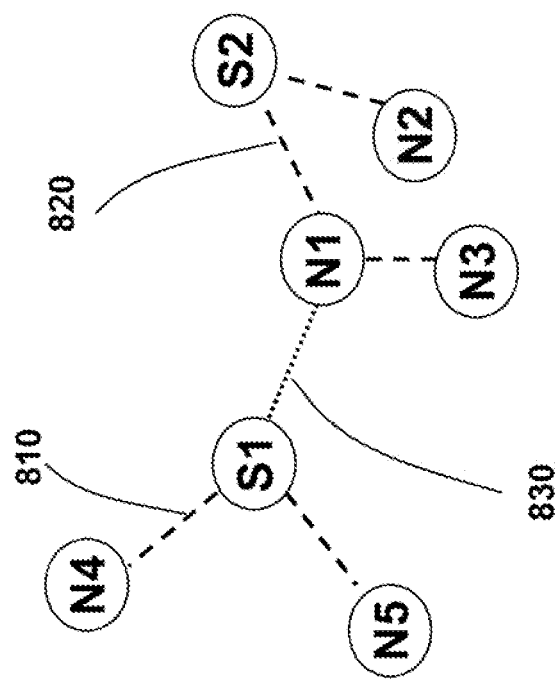
FIG. 8B is a schematic an example in which a node can perform immediate primary data sink switching.

As shown in FIG. 8A, if N1 broadcasts a sink switch packet 910, N3 receives the packet and transmits a switch delay request packet 920 and requests the node N1 to wait for one synchronization interval. In next synchronization interval, the node N3 switches 840 its route to Sink 2 from N1 to N2. After N3's switches its route to S2, it is safe for N1 to switches its primary sink from S2 to S1 as shown in FIG. 8B.

Structures of Synchronization Packets

Some embodiments of the invention use different types of packets for synchronization purpose. The types of packets include a SYNC-START packet, a SYNC-REQ packet, and a SYNC-RES packet.

FIG. 10A shows a structure of the SYNC-START packet 1010. The SYNC-START packet includes one or combination of a type field 1011 to indicate a type of packet, a Sink_ID field 1012 indicating ID of data sink that initiates synchronization process, a Sync_Seq field 1013 indicating a synchronization sequence number maintained by the data sink, a Sync_Config field 1014 indicating configurations of synchronization interval, and an options field 1015 indicating other options. Value of Sync_Seq field is incremented by 1 each time data sink transmits a SYNC-START packet, and value of Sync_Seq field is greater than zero.

A content 1016 of Sync_Config field include a Start time field to indicate starting time of this synchronization interval, a Next_Sync field indicating the number of synchronization intervals next SYNC-START packet transmission and value for this field must be greater zero, a Routing_L field indicating length of routing period, a Sync_L field indicating length of synchronization period, a Data_L field indicating length of data period, and a Control_L field indicating length of control period.

FIG. 10B shows a structure of the SYNC-REQ packet 1020. The SYNC-REQ packet includes one or combination of a type field 1021 to indicate a type of packet, a Node_ID field 1022 indicating ID of node that transmits synchronization request packet, a Dest_ID field 1023 indicating destination of SYNC-REQ packet, a Sync_Seq field 1024 indicating a synchronization sequence number obtained from received SYNC-START packet, and an options field 1025 indicating other options.

FIG. 10C shows a structure of SYNC-RES packet 1030. The SYNC-RES packet includes one or combination of a type field 1031 to indicate a type of packet, a Node_ID field 1032 indicating ID of node from which synchronization response packet is sent, a Dest_ID field 1033 indicating destination of SYNC-RES packet, a Sync_Seq field 1034 indicating a synchronization sequence number obtained from received SYNC-REQ packet, a TR field 1035 indicating a time of receiving the SYNC-REQ packet, a TT field 1036 indicating a time of transmitting the SYNC-RES packet, and an options field 1037 indicating other options. TR and TT are recorded only based on clock of node or sink that receives SYNC-REQ packet and transmits SYNC-RES packet.

Some embodiments, between synchronization intervals where SYNC-START packet is transmitted, use the routing period and synchronization period in a synchronization interval for data packet transmission or other purposes. For example, a data sink can monitor other data sink SYNC-START packet and selects to transmit its SYNC-START packet where no other data sinks transmit their SYNC-START packet.

Passive Synchronization

Some embodiments of the invention are based on a realization that nodes can perform the synchronization with data sinks without transmitting any synchronization packets. This is because, in the LLN, the node can receive packets transmitted by neighboring nodes. Thus, in some situations, the node can synchronize to the data sink based on synchronization packets exchanged between the data sink and the neighboring node. Additionally or alternatively, the node can synchronize to the data sink based on synchronization packets exchanged between the neighboring node and a synchronized neighboring node that was previously synchronized with the data sink. Passive synchronization reduces communication overhead.

For example, some of nodes in the LLN can perform an active synchronization and some nodes can perform a passive synchronization. In active synchronization, a node exchanges synchronization packets with the data sink or a synchronized neighboring node. However, in the passive synchronization, a node does not transmit any packets and only uses synchronization packets transmitted by other nodes.

Figure 11A:
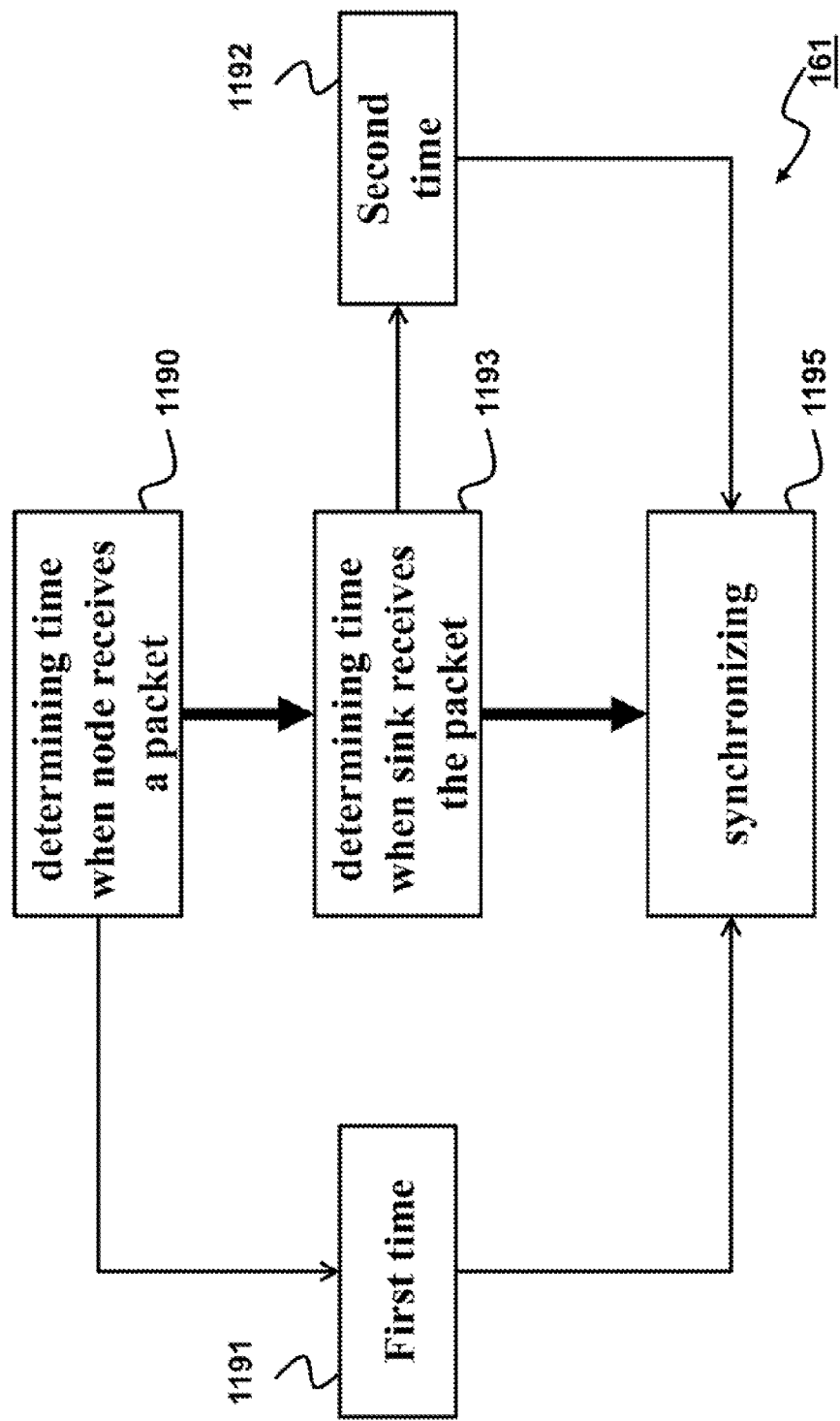
FIG. 11A is a block diagram of a synchronization method according to one embodiment of the invention.

FIG. 11A shows a block diagram of a method for synchronizing a node to a data sink in the LLN according to one embodiment of the invention. The embodiment determines 1190 a first time 1191 when the node receives a packet transmitted by a neighboring node. The embodiment also determines 1193 a second time 1192 when the data sink or a synchronized neighboring node receives the same packet from the neighboring node. The node and the data sink are synchronized 1195 based on the difference between the first time and the second time.

The method can be implemented by a node using the processor 161. In some embodiments, the node receives a SYNC-REQ packet transmitted by the neighboring node in response to receiving a SYNC-START packet transmitted by the data sink or a synchronized neighboring node. The node records the time of receiving the SYNC-REQ packet as the first time. In addition, the node receives a SYNC-RES packet transmitted by the data sink or a synchronized neighboring node in response to receiving the SYNC-REQ packet. The SYNC-RES packet includes a field indicating when the data sink or a synchronized neighboring node received the SYNC-REQ packet. The node retrieves the second time from the SYNC-RES packet.

In some embodiments, the data sink is a root of the DODAG topology. Additionally or alternatively, the data sink can be other node synchronized on the root of the DODAG.

Multi-Hop Synchronization

In some embodiments, the node in the LLN synchronizes its clock to the clock of the primary data sink and maintains time offsets to its secondary data sinks. To reduce communication overhead, some of nodes perform active synchronization and other nodes perform passive synchronization. Synchronization process is initiated by data sink. To start synchronization process, a data sink broadcasts a SYNC-START packet. The broadcasted SYNC-START packet is received by one-hop neighbors of the data sink. Upon receiving the SYNC-START packet, the one-hop neighbors that select this sink as their primary data sink perform either active synchronization or passive synchronization to synchronize their clocks to the clock of the sink. The one-hop neighbors of the data sink that select this sink as their secondary data sink perform either active synchronization or passive synchronization to calculate their clock offsets. After performing the synchronization, the one-hop neighbors broadcast the YNC-START packet to let two-hop neighbors of the data sink synchronize their clock or calculate their time offsets. This process continues until all nodes that select this sink as the primary or the secondary data sink are synchronized or calculated clock offsets.

Figure 11B:
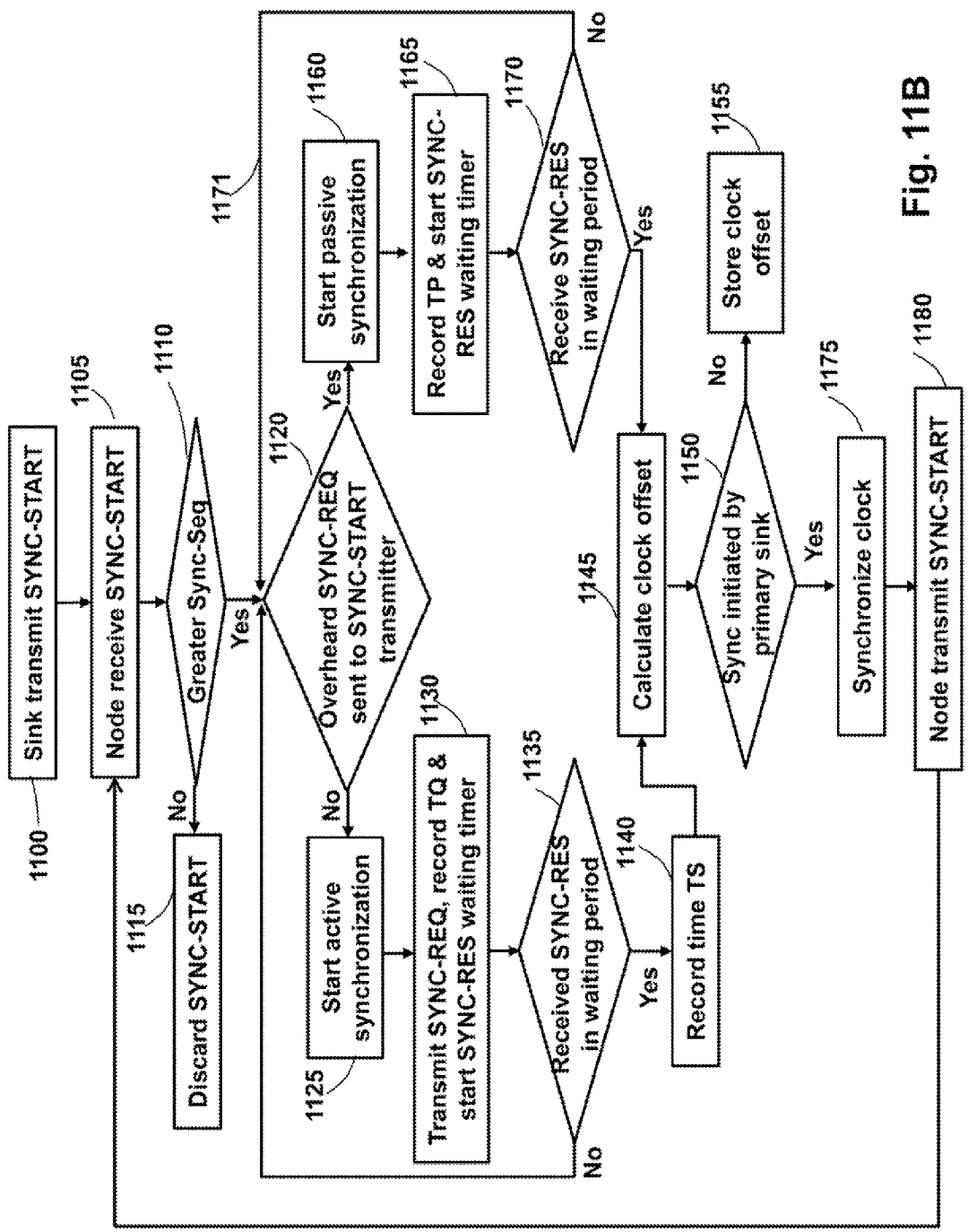
FIG. 11B is a block diagram of multi-hop synchronization method according to some embodiments of the invention.

FIG. 11B shows a block diagram of multi-hop synchronization process according to one embodiment of the invention. To configure a SYNC-START packet, the data sink sets Type field of the packet to a SYNC-START, Sink_ID of the packet to its ID, Sync_Seq=1, Start Time to time this packet being transmitted, and all other fields to appropriate values. If the node is not a data sink, the node sets its Sync-Seq to 0.

The data sink initiates synchronization by broadcasting 1100 the SYNC-START packet. Upon receiving 1105 a SYNC-START packet transmitted 1100 by the data sink or transmitted 1180 by a neighbor node synchronized on the data sink, node determines 1110 if SYNC-START packet includes a greater Sync_Seq value than currently available to the node. If not, the node discards 1115 SYNC-START packet. If yes, the node checks 1120 if the SYNC-REQ packet being sent to SYNC-START packet transmitter. If not, the node starts 1125 active synchronization.

During the active synchronization, the node generates a SYNC-REQ packet and performs random backoff process. If no SYNC-REQ transmitted by other node is received by the end of random backoff process, node starts a timer for SYNC-RES waiting period, transmits 1130 SYNC-REQ packet to a data sink or a synchronized neighboring node from which the node received the SYNC-START packet, records time TQ indicating when the SYNC-REQ packet was transmitted, and then waits for the SYNC-RES packet. Receiving node of SYNC-REQ packet generates and transmits a SYNC-RES packet back to the requesting node.

If the node receives 1135 a SYNC-RES packet within a waiting period, the node records 1140 time TS when SYNC-RES packet received, and calculates 1145 its offset to clock of SYNC-START transmitter by using time records TQ, TS, and time records TR, TT retrieved from the SYNC-RES packet For example, in one embodiment, the node determines the clock offset according to $$\text{Offset} = \frac{((TS - TQ) - (TT - TR))}{2}, \qquad (2)$$

wherein TQ is the time of transmitting the SYNC-REQ packet, TS is the time of receiving the SYNC-RES packet, TT is a time of transmitting the SYNC-RES packet by the data sink or a synchronized neighboring node, and TR is a time of receiving the SYNC-REQ packet by the data sink or a synchronized neighboring node.

After the offset is calculated, the node determines 150 if synchronization process is initiated by its primary data sink. If not, node stores 1155 clock offset. If yes, node synchronizes 1175 its clock to a clock of the node transmitted the SYNC-START packet. After the node synchronizes its clock, the node transmits 1180 a SYNC-START packet to let its neighbors continue synchronization process. If the node does not receive SYNC-RES packet 1135 within waiting period, the node starts synchronization again.

After receiving a SYNC-START packet, if the node receives 1120 a SYNC-REQ packet transmitted to SYNC-START transmitter, e.g., the data sink or the node synchronized with the data sink, the node starts 1160 a passive synchronization process.

During the passive synchronization, the node records 1165 time TP when SYNC-REQ packet is received and starts a timer for waiting SYNC-RES packet. If the node receives 1170 the corresponding SYNC-RES packet, the node calculates 1145 clock offset to clock of SYNC-START transmitter as follows:

$$\text{Offset} = TR - TP, \quad (3)$$

wherein TP is the time of receiving the SYNC-REQ packet by the node, and TR is a time of receiving the SYNC-REQ packet by the data sink or a synchronized neighboring node that transmitted SYNC-START packet, and wherein the TR time is includes in the SYNC-RES packet.

After the offset is calculated, the node determines 1150 if synchronization process is initiated by its primary data sink. If not, node stores 1155 the offset. If yes, the node synchronizes 1175 its clock to clock of SYNC-START transmitter. After the node synchronizes its clock, the node transmits 1180 a SYNC-START packet to let its neighbors continue synchronization process.

If passive synchronization node 1170 does not receive the SYNC-RES packet within waiting period, the node restarts synchronization 1171. If a node performing passive synchronization receives multiple SYNC-REQ and SYNC-RES pairs, then the node may use these pairs to improve clock accuracy.

If a node does not receive any synchronization related packet corresponding to its primary or secondary data sink within a synchronization interval where a synchronization period presents, then the node can broadcast a SYNC-REQ packet with Sync_Seq set to 0. Upon receiving a SYNC-REQ packet with Sync_Seq equal to 0, a neighboring node that performed synchronization in current synchronization period can respond with a SYNC-RES packet to let requesting node perform the active synchronization.

Figure 12B:
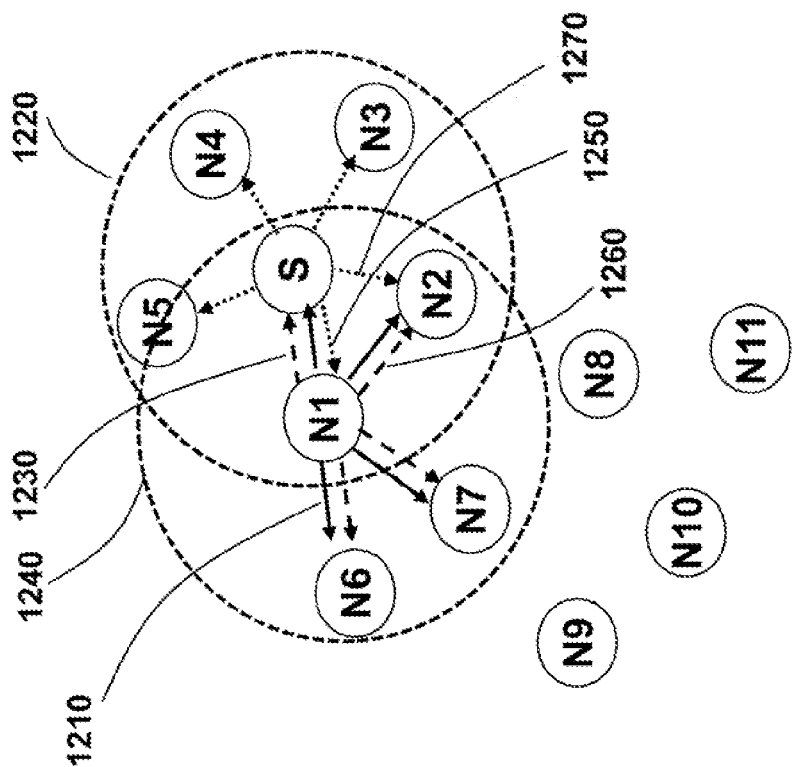
FIG. 12B is a schematic of a synchronization packet transmission and receiving packets from neighboring nodes.
Figure 12A:
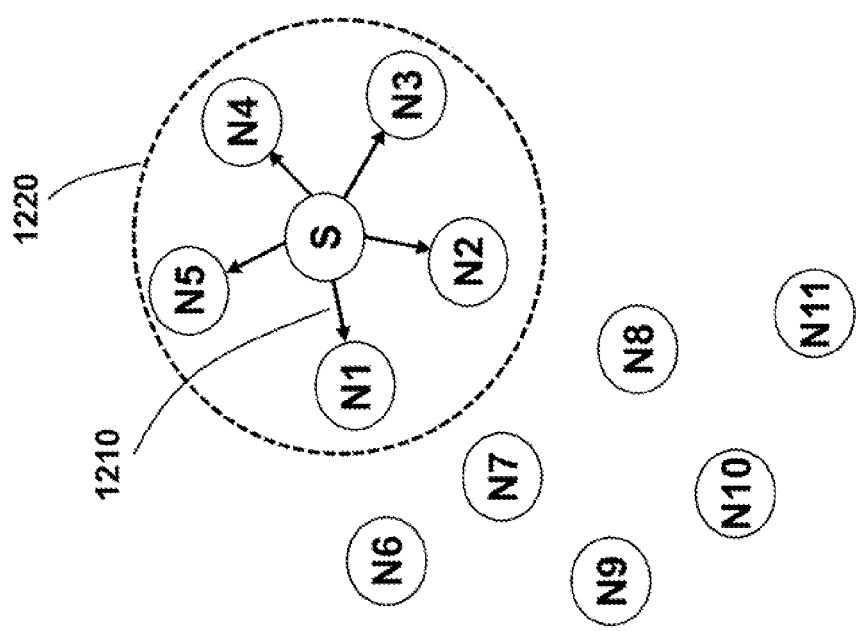
FIG. 12A is a schematic of a transmission of synchronization start packet by a sink.

FIGS. 12A and 12B show examples of synchronization process. As shown in FIG. 12A, to start synchronization process, a data sink S broadcasts 1210 a SYNC-START packet. The one-hop neighbors N1-N5 are within data sink S coverage range 1220. Therefore, the nodes N1-N5 receive the SYNC-START packet. Upon receiving SYNC-START packet, the one-hop neighbor N1 performs active synchronization to the data sink S and the one-hop neighbor N2 performs passive synchronization to the data sink S.

In FIG. 12B, the node N1 performs active synchronization with the data sink S. The node N1 generates a SYNC-REQ packet and transmits 1230 SYNC-REQ packet to the data sink S. There are four nodes S, N2, N6 and N7 within a coverage area 1240 of the node N1. Therefore, these four nodes can receive the SYNC-REQ packet transmitted by node N1.

In response to receiving a SYNC-REQ packet, the data sink S generates and transmits 1250 a SYNC-RES packet back to the node N1. The nodes N1-N5 can receive the SYNC-RES transmitted by the data sink S. Upon receiving the SYNC-RES packet, the node N1 synchronizes its clock to a clock of the data sink S. The node N1 then transmits 1210 a SYNC-START packet to let its neighbors perform synchronization process. In the example, the nodes S, N2, N6 and N 7 can receive SYNC-START packet transmitted by the node N1. However, in this example the node N2 can perform passive synchronization to sink S. Even nodes N6 and N7 can receive the SYNC-REQ packet transmitted by the node N1, the nodes N6 and N7 cannot receive SYNC-RES packet transmitted by the data sink S. As a result, the nodes N6 and N7 cannot perform passive synchronization with the data sink S. Instead, one of nodes N6 and N7 can perform active synchronization with the node N1 and other can perform passive synchronization with the node N1.

When the node N1 transmits 1220 SYNC-REQ packet to the data sink S, the node N2 receives 1260 this SYNC-REQ packet. The node N2 also received SYNC-START packet broadcasted by the data sink S as shown in FIG. 12A. Therefore, the node N2 can perform passive synchronization by monitoring SYNC-RES packet. The node N2 records time TP upon receiving the SYNC-REQ packet transmitted by the node N1 and starts a timer to wait for SYNC-RES packet. The node N2 receives 1270 SYNC-RES packet sent by the data sink S to node N1 within SYNC-RES waiting period, and synchronizes its clock to a clock of the data sink S. In some embodiments a first preference of a node is to perform passive synchronization to reduce communication overhead.

Figure 13B:
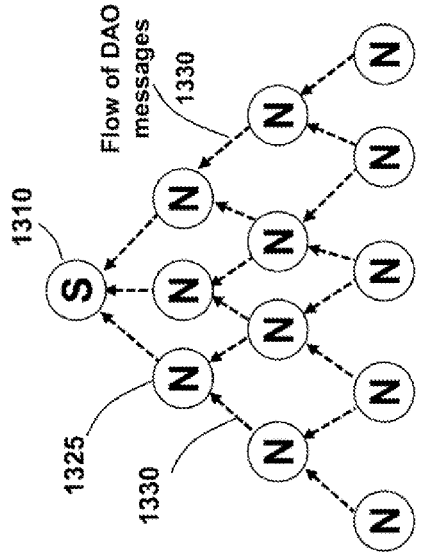
FIG. 13B is a schematic of a flow of the DAO messages employed by some embodiments of the invention.
Figure 13D:
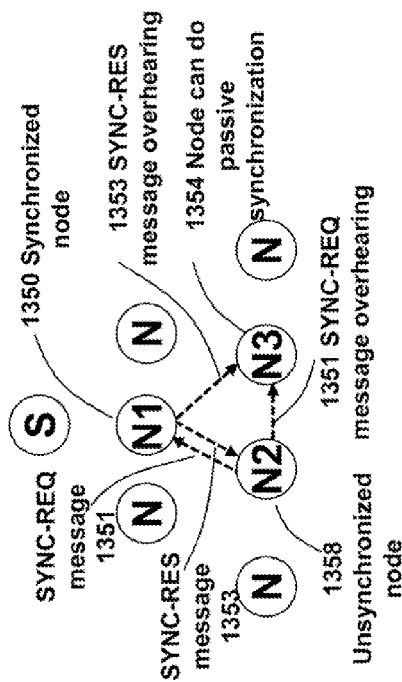
FIG. 13D is a schematic of the SYNC-REQ and the SYNC-RES message exchange according to some embodiments of the invention.
Figure 13A:
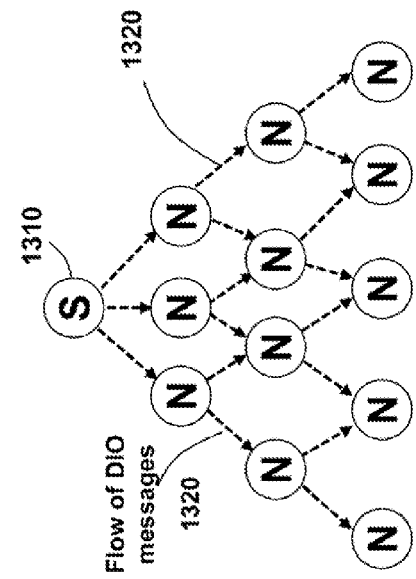
FIG. 13A is a schematic of a flow of the DIO messages employed by some embodiments of the invention.
Figure 13C:
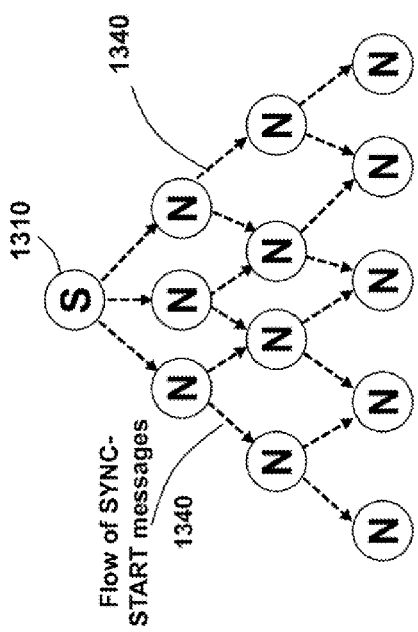
FIG. 13C is a schematic of a flow of the SYNC-START messages employed by some embodiments of the invention.

FIGS. 13A-13F show flows of various messages. As shown in FIG. 13A, the DIO messages are initiated by the sink nodes 1310 and propagated 1320 through the network. FIG. 13B shows a schematic of a flow of flow 1330 of the DAO messages, in which the DAO messages are generated by non-sink nodes 1325 and flow towards the sink nodes 1310. FIG. 13C shows a schematic of a flow 1340 of the SYNC-START messages, which are initiated by sink nodes 1310 and propagated 1340 through the network.

FIG. 13D shows the transmissions of the SYNC-REQ 1351 and SYNC-RES 1353 messages. An unsynchronized node N2 1358 generates a SYNC-REQ message 1351 and transmits the message 1351 to a synchronized node N1 1350. The node 1350 replies with a SYNC-RES message 1353. A neighboring node N3 overhears both messages 1351 and 1353 and can perform passive synchronization.

Figure 13F:
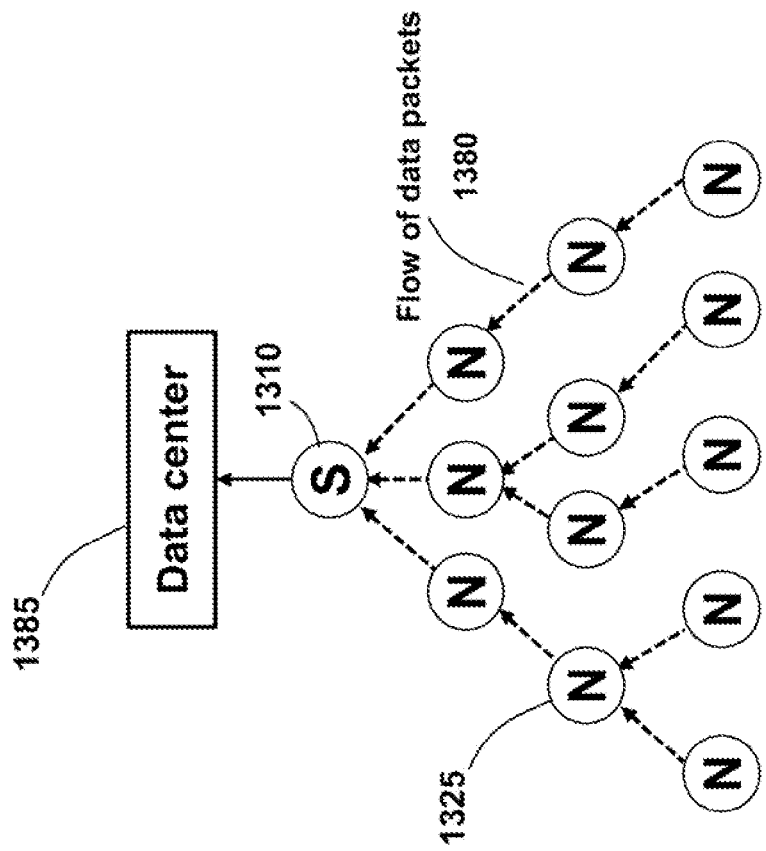
FIG. 13F is a schematic of the flow of a data packet employed by some embodiments of the invention.
Figure 13E:
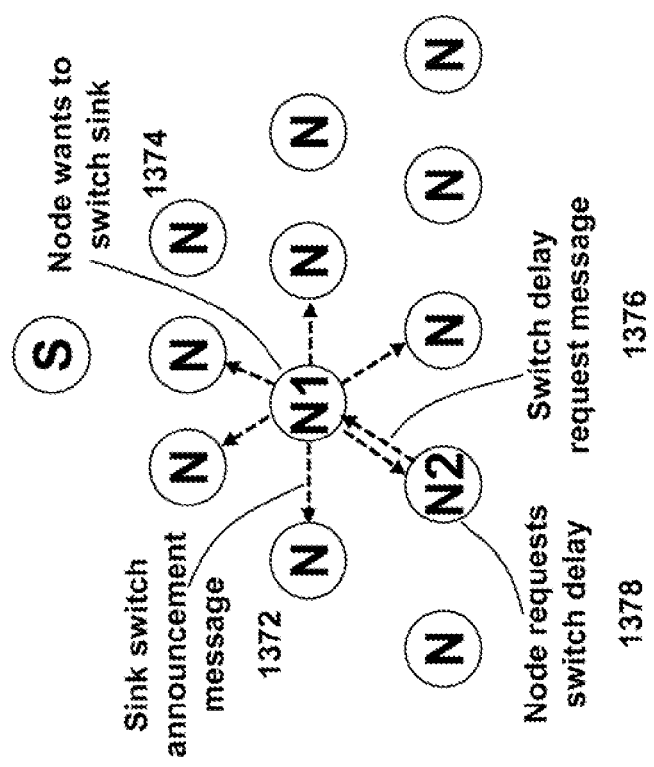
FIG. 13E is a schematic of the Sink-Switch and the Switch-Delay message exchange according to some embodiments of the invention.

FIG. 13E shows transmissions of the Sink-Switch 1372 and Switch-Delay 1376 messages, in which node N1 1374 in order to switch the sink broadcasts a Sink-Switch message 1372 to its neighboring nodes. The neighboring node N2 1378 does not want the node N1 to make immediate sink switch and therefore, sends a Switch-Delay message 1376 to the node N1.

FIG. 13F shows a schematic of a flow of data packets 1380, which are generated by the non-sink nodes 1325 and flow towards the sink nodes 1310, which then forward data packets to the data center 1385.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format. The processor can be connected to memory, transceiver, and input/output interfaces as known in the art.

Also, the various methods or processes outlined herein may be coded as software that is executable on one or more processors that employ any one of a variety of operating systems or platforms. Alternatively or additionally, the invention may be embodied as a computer readable medium other than a computer-readable storage medium, such as signals.

The terms "program" or "software" are used herein in a generic sense to refer to any type of computer code or set of computer-executable instructions that can be employed to program a computer or other processor to implement various aspects of the present invention as discussed above.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for transmitting packets in a wireless network including a node, a first data sink and a second data sink, comprising:
    performing a synchronization of the node with the first data sink;
    determining a clock offset between the clock of the node and a clock of the second data sink, wherein the first data sink is not synchronized with the second data sink, such that the clock offset is not zero;
    storing the clock offset in a memory of the node;
    transmitting first data packets from the node to the first data sink at a first allocated time synchronized with the first data sink; and
    transmitting second data packets from the node to the second data sink using the clock offset at a second allocated time synchronized with the second data sink, wherein the second data packets are transmitted without updating the synchronization of the node with the second data sink.

2. The method of claim 1, further comprising:
    designating the first data sink as a primary data sink;
    designating the second data sink as a secondary data sink;
    transmitting data packets to the primary data sink; and
    switching the designations of the primary and the secondary data sinks without updating the synchronization.

3. The method of claim 2, further comprising:
    discovering at least one route from the node to the primary data sink and the secondary data sink; and
    maintaining the routes to the primary data sink and the secondary data sink after the switching.

4. The method of claim 2, wherein the switching comprises:
    broadcasting a sink switching packet within a control period; and
    switching the designations within the control period only if a switching delay request packet is not received within a synchronization period.

5. The method of claim 1, further comprising:
    synchronizing a clock of the node with a clock of the second data sink using the clock offset stored in the memory;
    determining another clock offset between the clock of the node and a clock of the first data sink, wherein the first data sink is not synchronized with the second data sink, such that the clock offset is not zero; and
    storing the other clock offset in the memory of the node.

6. The method of claim 1, further comprising:
    determining a subset of data sinks, such that the node is within a coverage area of each data sink in the subset;
    determining, for each data sink S in the subset a value of P(S) according to $$P(S) = ETR(S) * \left(1 - \frac{N(S)_p}{N(S)_{max}}\right) * \left(1 - \frac{N(S)_s}{N(S)_{max}}\right) * \left(1 - \frac{H(S)_{min}}{H(S)_{max}}\right),$$

wherein ETR(S) is expected reliability of a data sink S, $N(S)_p$ is a number of primary members of the data sink S, $N(S)_s$ is a number of secondary members of the data sink S, $N(S)_{max}$ is a maximum number of nodes that can be supported by the data sink S, $H(S)_{min}$ is a minimum number of hops from the node to the data sink S, and $H(S)_{max}$ is a maximum number of hops allowed by the data sink S;
    designating a data sink having the maximum value of P(S) as a primary data sink; and
    designating other data sinks with subsequent values of P(S) as secondary data sinks.

7. A method for transmitting packets in a low power and lossy network (LLN), wherein the LLN includes a set of nodes and a set of data sinks, wherein at least part of the data sinks initiate Destination Oriented Directed Acyclic Graph (DODAG) formation by configuring and transmitting the DODAG information object (DIO) messages, comprising:
    selecting a subset of data sinks for a node of the LLN;
    discovering at least one route from the node to each data sink in the subset;
    designating the data sinks in the subset as a primary data sink and a set of secondary data sinks;
    performing, in response to the DODAG formation, a synchronization of the node with each data sink in the subset, wherein the performing the synchronization comprises synchronizing a clock of the node with a clock of the primary data sink and maintaining by the node an offset between the clock of the node and a clock of a secondary data sink;
    determining clock offsets between a clock of the node and clocks of the secondary data sinks;
    storing the clock offsets in a memory of the node;
    transmitting data packets from the node to the primary data sink;
    switching the designations of the primary data sink and the secondary data sink without updating the synchronization receiving, by the node, a SYNC-START packet transmitted by a selected data sink or a synchronized neighboring node;

transmitting, by the node in response to receiving the SYNC-START packet, a SYNC-REQ packet;

receiving, by the node in response to transmitting the SYNC-REQ packet, a SYNC-RES packet from the selected data sink or the synchronized neighboring node;

determining the offset between the clock of the node and a clock of the selected data sink or the synchronized neighboring node based on a time of transmitting the SYNC-REQ packet and a time of receiving the SYNC-RES packet;

determining if the selected data sink is the primary data sink or a secondary data sink; and synchronizing the clock of the node with the clock of the selected data sink based on the offset, if the selected data sink is the primary data sink; and otherwise storing the offset at a memory of the node.

8. The method of claim 7, further comprising:
transmitting a DODAG information object (DIO) message from each data sink in the subset to the node; and
transmitting a destination advertisement object (DAO) message from the node to each data sink in the subset.

9. The method of claim 7, wherein at least part of the data sinks initiate Destination Oriented Directed Acyclic Graph (DODAG) formation by configuring and transmitting the DODAG information object (DIO) messages, further comprising:
selecting the primary data sink and the set of secondary data sinks according to $$P(S) = ETR(S) * \left(1 - \frac{N(S)_p}{N(S)_{max}}\right) * \left(1 - \frac{N(S)_s}{N(S)_{max}}\right) * \left(1 - \frac{H(S)_{min}}{H(S)_{max}}\right),$$

where S represents a data sink S, an ETR field indicates expected reliability estimated by a data sink generating the DIO message, such that ETR(S) is obtained from the DIO message of the data sink S, $N(S)_p$ is a number of primary members of the data sink S, $N(S)_s$ is a number of secondary members of the data sink S, $N(S)_{max}$ is a maximum number of nodes that can be supported by the data sink S, $H(S)_{min}$ is a minimum number of hops from the node to the data sink S, and $H(S)_{max}$ is a maximum number of hops allowed by the data sink S, wherein the node selects the primary data sink S that maximizes a value of P(S) and selects the set of secondary data sinks with subsequent values of P(S).

10. The method of claim 7, wherein the switching comprises:
broadcasting a sink switching packet in a control period; and
switching in the control period only if a switching delay request packet is not received within a synchronization period.

11. The method of claim 7, wherein the selecting further comprises:
determining a maximal number of hops controlling a coverage area of a data sink; and
selecting the data sink from the plurality of data sinks, if the node is within the coverage area of the data sink.

12. The method of claim 7, wherein the offset is determined according to $$Offset = \frac{((TS - TQ) - (TT - TR))}{2},$$

wherein TQ is the time of transmitting the SYNC-REQ packet, TS is the time of receiving the SYNC-RES packet, TT is a time of transmitting the SYNC-RES packet by the selected data sink or the synchronized neighboring node, and TR is a time of receiving the SYNC-REQ packet by the selected data sink or the synchronized neighboring node.

13. The method of claim 7, further comprising:
receiving, by the node, a SYNC-REQ packet transmitted by a neighboring node in response to receiving a SYNC-START packet transmitted by a selected data sink or the synchronized neighboring node;

receiving, by the node, a SYNC-RES packet transmitted by the selected data sink or a synchronized neighboring node in response to receiving the SYNC-REQ packet;

determining the offset between the clock of the node and a clock of the selected data sink based on a time of receiving the SYNC-REQ packet by the node and by the selected data sink or the synchronized neighboring node;

determining if the selected data sink is the primary data sink or a secondary data sink; and synchronizing the clock of the node with the clock of the selected data sink based on the offset, if the selected data sink is the primary data sink; and otherwise storing the offset at the node.

14. The method of claim 13, wherein the offset is determined according to $$Offset = TR - TP,$$

wherein TP is the time of receiving the SYNC-REQ packet by the node, and TR is a time of receiving the SYNC-REQ packet by the selected data sink or the synchronized neighboring node, further comprising:
recording the time TP upon the receiving the SYNC-REQ packet; and
retrieving the time TR from the SYNC-RES packet.

15. A node for forming a wireless network, comprising:
a clock;
a processor for performing a synchronization of the clock of the node with a clock of a first data sink in the network and for determining a clock offset between the clock of the node and a clock of a second data sink in the network;
a memory for storing the clock offset; and
a transmitter for synchronized transmission of data packets, wherein operations of the transmitter comprise:
performing a synchronization of the node with the first data sink;
determining a clock offset between the clock of the node and a clock of the second data sink, wherein the first data sink is not synchronized with the second data sink, such that the clock offset is not zero;
storing the clock offset in a memory of the node;
transmitting first data packets from the node to the first data sink at a first allocated time synchronized with the first data sink; and
transmitting second data packets from the node to the second data sink using the clock offset at a second allocated time synchronized with the second data sink, wherein the second data packets are transmitted without updating the synchronization of the node with the second data sink.

16. The node, of the claim 15, wherein the processor determines and stores in the memory at least one route from the node to the first data sink and the second data sink.

17. The node of the claim 15, wherein the synchronization is a passive synchronization if the node receives synchronization packets of a synchronized node.

18. The node of claim 15, wherein the transmitter transmits the data packets to the first data sink, broadcasts a sink switching packet within a control period, and transmits the data packets to the second data sink unless a switching delay request packet is received within a synchronization period in response to the broadcasted sink switching packet.

* * * * *